US012572351B2

(12) United States Patent
Chakhvadze et al.

(10) Patent No.: US 12,572,351 B2
(45) Date of Patent: Mar. 10, 2026

(54) INTEGRATION OF MACHINE LEARNING MODELS INTO SOFTWARE SYSTEMS USING SOFTWARE LIBRARY

(71) Applicant: Discover Beagle, Inc., Brooklyn, NY (US)

(72) Inventors: Artur Chakhvadze, London (GB); Maksim Ivanov, Bellevue, WA (US)

(73) Assignee: Discover Beagle, Inc., Brooklyn, NY (US)

( * ) Notice: Subject to any disclaimer, the term of this patent is extended or adjusted under 35 U.S.C. 154(b) by 256 days.

(21) Appl. No.: 18/228,655

(22) Filed: Jul. 31, 2023

(65) Prior Publication Data

US 2025/0045023 A1 Feb. 6, 2025

(51) Int. Cl.
G06F 8/70 (2018.01)
G05B 13/00 (2006.01)
G06F 8/30 (2018.01)
G06F 18/00 (2023.01)

(52) U.S. Cl.
CPC ................. G06F 8/70 (2013.01); G06F 8/30 (2013.01); G05B 13/00 (2013.01); G06F 18/00 (2023.01)

(58) Field of Classification Search
CPC ............ G06F 8/30; G06F 18/00; G05B 13/00
See application file for complete search history.

(56) References Cited

U.S. PATENT DOCUMENTS

| 11,995,411 B1 * | 5/2024 | Qadrud-Din ........... G06N 3/045 |
| 2010/0121630 A1 * | 5/2010 | Mende .................... G06F 40/30 |
| | | 704/7 |

| 2018/0189259 A1 * | 7/2018 | Merl ..................... G06F 40/263 |
| 2021/0192397 A1 | 6/2021 | Rastogi et al. |
| 2022/0327382 A1 * | 10/2022 | Sexton ..................... G06N 3/08 |
| 2023/0008874 A1 * | 1/2023 | Stabrawa ............ G06F 9/45558 |
| 2023/0259705 A1 * | 8/2023 | Tunstall-Pedoe .... G06N 3/0499 |
| | | 704/9 |
| 2024/0201959 A1 * | 6/2024 | Callegari .................. G06F 8/35 |
| 2024/0362036 A1 * | 10/2024 | Jacob .................... G06F 3/0481 |
| 2024/0394511 A1 * | 11/2024 | Thevenin ............... G06N 3/088 |
| 2024/0427793 A1 * | 12/2024 | Stein ..................... G06F 16/258 |
| 2025/0045025 A1 | 2/2025 | Chakhvadze et al. |

FOREIGN PATENT DOCUMENTS

WO WO-2023072632 A1 5/2023

OTHER PUBLICATIONS

U.S. Appl. No. 18/228,653, Examiner Interview Summary mailed Sep. 12, 2025, 2 pgs.
U.S. Appl. No. 18/902,195, Non Final Office Action mailed Jun. 13, 2025, 20 pgs.

* cited by examiner

*Primary Examiner* — Qing Chen
*Assistant Examiner* — Travis Viet Tran
(74) *Attorney, Agent, or Firm* — Schwegman Lundberg & Woessner, P.A.

(57) ABSTRACT

Various embodiments described herein support or provide operations including receiving input data that comprises a collection of data units; determining that the collection of data units corresponds to a number of tokens that exceeds an upper limit of tokens; processing the collection of data units to generate a plurality of outputs; and aggregating the plurality of outputs into a final result provided as output of a function.

19 Claims, 8 Drawing Sheets

300

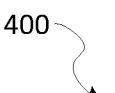
400
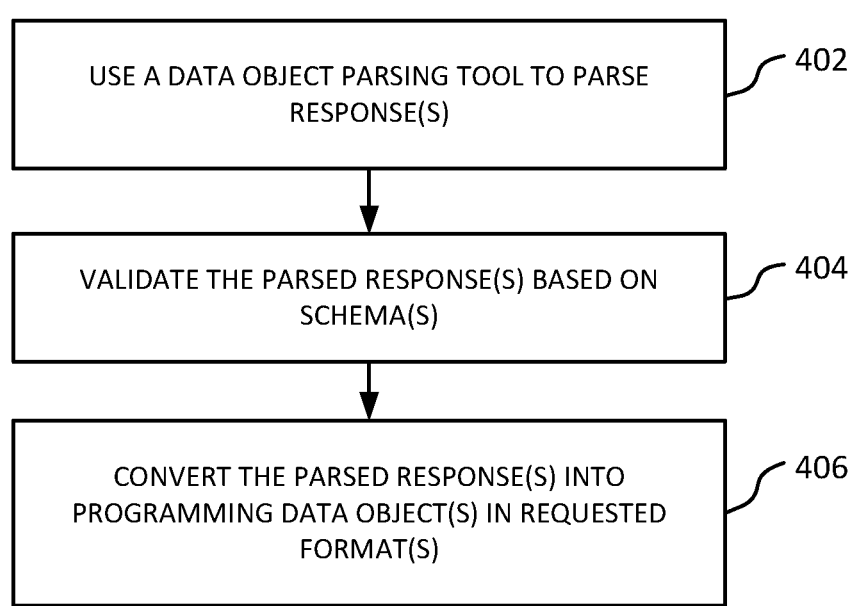
USE A DATA OBJECT PARSING TOOL TO PARSE RESPONSE(S)    402
VALIDATE THE PARSED RESPONSE(S) BASED ON SCHEMA(S)    404
CONVERT THE PARSED RESPONSE(S) INTO PROGRAMMING DATA OBJECT(S) IN REQUESTED FORMAT(S)    406
*FIG. 4*

500

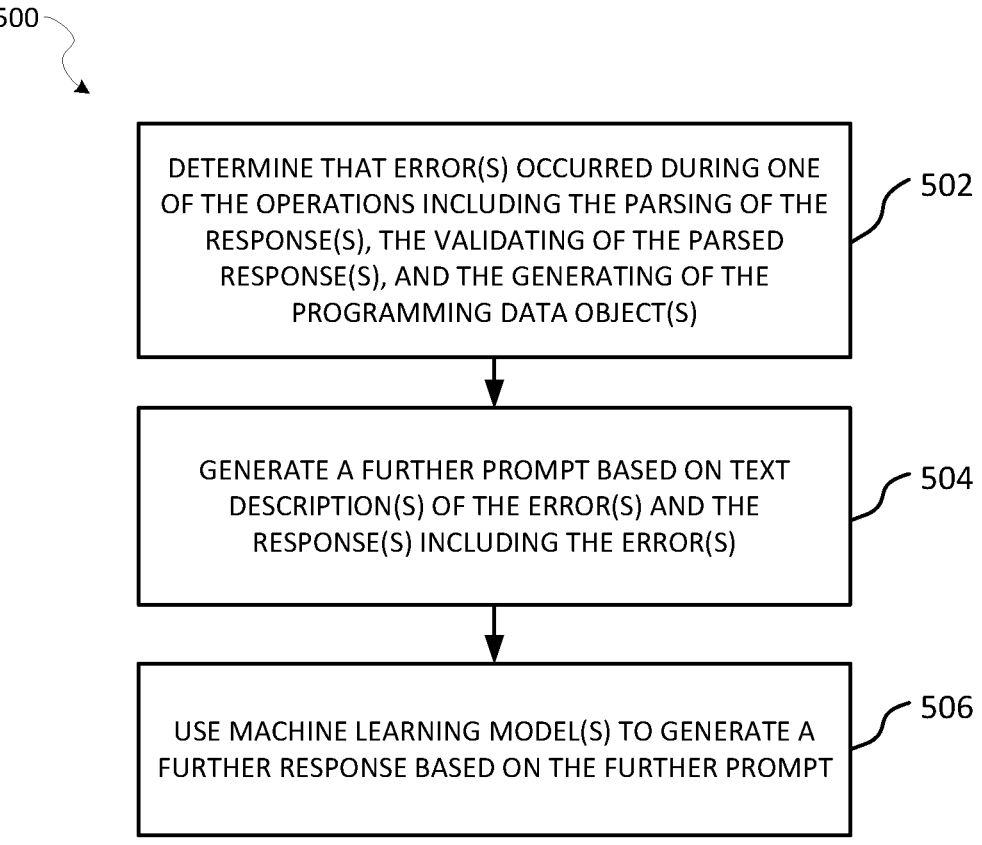

DETERMINE THAT ERROR(S) OCCURRED DURING ONE OF THE OPERATIONS INCLUDING THE PARSING OF THE RESPONSE(S), THE VALIDATING OF THE PARSED RESPONSE(S), AND THE GENERATING OF THE PROGRAMMING DATA OBJECT(S) — 502

GENERATE A FURTHER PROMPT BASED ON TEXT DESCRIPTION(S) OF THE ERROR(S) AND THE RESPONSE(S) INCLUDING THE ERROR(S) — 504

USE MACHINE LEARNING MODEL(S) TO GENERATE A FURTHER RESPONSE BASED ON THE FURTHER PROMPT — 506

*FIG. 5*

INTEGRATION OF MACHINE LEARNING MODELS INTO SOFTWARE SYSTEMS USING SOFTWARE LIBRARY

TECHNICAL FIELD

The present disclosure generally relates to the integration of machine learning models into software systems using a software library. More particularly, various embodiments described herein provide for systems, methods, techniques, instruction sequences, and devices that facilitate interoperability between Artificial Intelligence (AI) logic implemented by large language models and traditional software code.

BACKGROUND

Current systems face challenges when it comes to integrating machine learning models into software systems. Specifically, it is challenging to utilize machine learning models within software system functions that receive programming language objects as inputs and generate programming language objects as outputs. It is also challenging to allow the software system to automatically handle error detection and corrections based on the model responses. Using machine learning models to handle a large amount of text input is a further challenge due to constraints, such as constraints on context lengths of model input.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of examples, and not limitations, in the accompanying figures.

FIG. 4 is a flowchart illustrating an example method for facilitating the integration of machine learning models into software systems using a software library, according to various embodiments of the present disclosure.

FIG. 5 is a flowchart illustrating an example method for facilitating the integration of machine learning models into software systems using a software library, according to various embodiments of the present disclosure.

DETAILED DESCRIPTION

Figure 1:
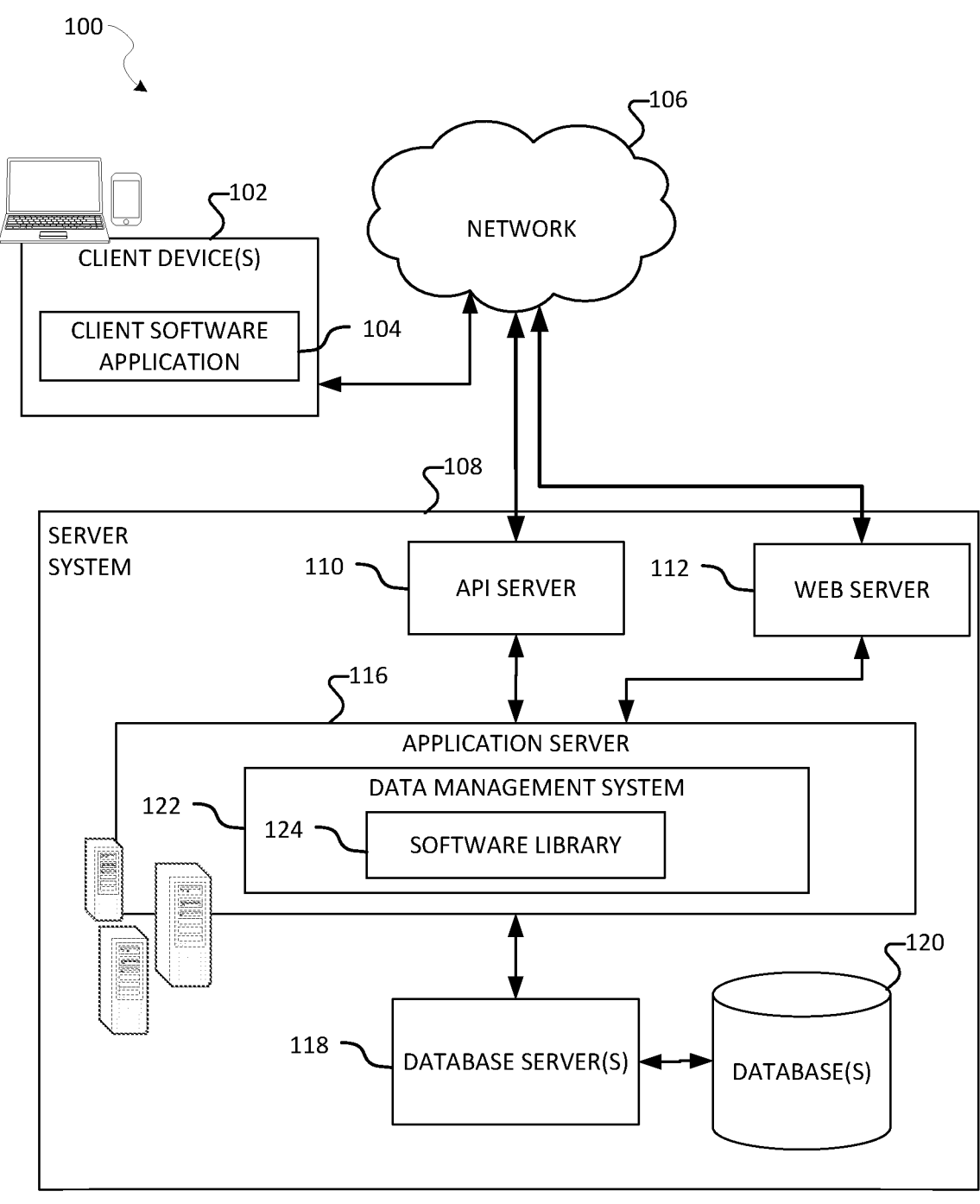
FIG. 1 is a block diagram showing an example data system that includes a data management system in an artificial intelligence system, according to various embodiments of the present disclosure.

The description that follows includes systems, methods, techniques, instruction sequences, and computing machine program products that embody illustrative embodiments of the present disclosure. In the following description, for purposes of explanation, numerous specific details are set forth in order to provide a thorough understanding of embodiments. It will be evident, however, to one skilled in the art that the present inventive subject matter can be practiced without these specific details.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations, and details are set forth in order to provide a thorough understanding of the present subject matter. However, it will be apparent to one of ordinary skill in the art that embodiments of the subject matter described can be practiced without the specific details presented herein, or in various combinations, as described herein. Furthermore, well-known features can be omitted or simplified in order not to obscure the described embodiments. Various embodiments may be given throughout this description. These are merely descriptions of specific embodiments. The scope or meaning of the claims is not limited to the embodiments given.

Various embodiments described herein can use state-of-the-art machine learning and artificial intelligence technologies to integrate machine learning models (e.g., large language models) into software systems using a software library. Specifically, the software library provides users with one or more functions that can be called to handle interactions with machine learning models and provide users with model responses in desired machine-readable formats. Further, the software library handles error detection and correction and converts textual representations of data objects included in model responses into one or more data objects in requested machine-readable formats for downstream processing. Such a conversion can be performed between data objects of arbitrary types and textual representations of such objects.

In various embodiments, a data management system can include a software library described herein. The data management system provides users one or more functions that can be called to handle interactions with machine learning models, such as large language models. Specifically, the data management system receives input data that comprises a function definition. The input data can include inputs of a function associated with the function definition. The data management system generates one or more schemas that describe output data in an output format expected in the function output. An output format can correspond to a format structure for how attribute values associated with the plurality of attributes are presented in the function output.

Output data can include one or more programming data objects, including but not limited to JavaScript Object Notation (JSON) objects and Python objects. Output data can be described by a type (or data type) described herein. Programming data objects (e.g., JSON objects) can be generated based on such a type using the software library described herein. A programming data object is not provided directly as a model input according to various embodiments. Users can define the type (or format) of data objects in the output data. The type of data objects can be in any object-oriented programming language. An example schema can include an object class structure definition that comprises a plurality of attributes and a natural language description (e.g., text description) for each attribute. In various embodiments, an attribute can be an object class structure or one of the basic classes, such as an integer, a string, a float, etc.

In various embodiments, upon receiving a request to execute a function described herein, the data management system executes the function based on the function definition. The execution of the function handles interactions with machine learning models. Such interactions can include a number of operations, including but not limited to, generating a prompt that includes a schema and the input data, using a machine learning model (e.g., a large language model) to generate a response based on the prompt, and generating the function output by converting the response into a programming data object in the output format described by the schema. The function output includes one or more programming data objects generated based on the model responses. The data management system returns the function output in response to receiving instructions (e.g., input data) from a user.

In various embodiments, calling a function can include specifying the function name, function definitions, function call operator, and data values (also referred to as arguments) the function expects to receive. Arguments are values for the parameters defined for the function. Arguments can be passed to the function provided by the data management system.

In various embodiments, the data management system uses a data object parsing tool (e.g., JSON parser) to parse the model responses. The data management system validates the parsed responses based on the schema to ensure the parsed responses conform to the schema (also referred to as output type schema). In response to determining that the parsed response is successfully validated, the data management system converts the model responses into one or more programming data objects (e.g., JSON objects, Python objects) and provides the requesting user with the one or more programming data objects as function outputs.

In various embodiments, the data management system automatically handles error detection and correction based on model responses. Specifically, upon receiving a model response, the data management system determines if an error occurred during at least one of the operations, including the operation of parsing the response; the operation of validating the parsed response, and the operation of generating the one or more programming data objects in the requested machine-readable format. Once an error is detected, the data management system generates a further prompt (e.g., the second prompt) based on a text description of the error and the model response that includes the error. The data management system uses the machine learning model to generate a further model response (e.g., second response) in the output format (e.g., requested machine-readable format) based on the further prompt. Once the further model response is generated, the data management system parses the response, validates the response against the schema, and converts the response into one or more into one or more programming data objects in the requested machine-readable format. Upon determining the further model response is free from error, the data management system passes the one or more programming data objects as function outputs to the requesting user for downstream processing.

In various embodiments, a prompt can include a text containing instructions and input data fed as inputs to large language models. For example, an example prompt can include "find all mentions of people and companies in the following text: "Ann is 34 years old, she is a software engineer at Company ABC", respond with a comma-separated list of extracted entities." An example model response can include "Ann, Company ABC."

In various embodiments, a prompt can include one or more prompt prefixes. A prompt prefix can include a piece of text with one or more instructions that guide the large language models to generate responses in a desired data format.

In various embodiments, a schema can include a tree-like description of the desired output format along with hints (e.g., text descriptions) to a large language model for each node of the tree. Each note of the tree can correspond to an attribute described herein. A subtree of the schema, such as an attribute, can itself be a schema that includes an object class structure or one of the basic classes, such as an integer, a string, a float, etc.

In various embodiments, the data management system identifies an instruction to the machine learning model based on the input data. The instruction describes at least an input data type and/or an output data type. In various embodiments, an instruction can describe only the output data types. The data management system generates a schema based on the input data type and the output data type.

In various embodiments, an algorithm (e.g., TypeToSchema) can be provided by the data management system to handle the generation of schemas. For example, upon determining that a data type (e.g., an attribute) is one of the atomic types (e.g., number, string, list, tuple, dictionary), the data management system can return a pre-defined template with an embedded hint (e.g., natural language description or text description) for the data type. Upon determining that a data type (e.g., an attribute) is not one of the atomic types and the data type is not provided with a hint (e.g., natural language description or text description), the data management system can use a large language model to generate a hint for the data type based on software code associated with the data type.

In various embodiments, the data management system can append a portion (e.g., the first paragraph) of a docstring as a hint for a data type. In various embodiments, the data management system uses parameter documentation strings as hints for parameters of a data type. The data management system uses a runtime reflection mechanism to locate the list of parameters for the type constructor and apply the algorithm (e.g., TypeToSchema) for each of the parameters recursively. The data management system returns a schema that includes a hint, the list of parameters of the data type, and the associated schemas.

In various embodiments, certain large language models support a special mode (e.g., Function Call Mode) of operation where their reply is explicitly constrained to be a data object (e.g., JSON object) conforming to the user-defined schema. Upon determining that the machine learning model supports the mode of operation that generates one or more data objects of a specific type that conforms to the schema, the data management system generates a prompt without including the schema. The schema is passed as a separate argument of the function described herein. If the data management system determines that the machine learning model does not support such a mode of operation, the data management system generates a prompt to include the schema.

Chunking

A challenge when using large language models is the models' limited context length. The total length of both model input and model output is limited by a fixed number of tokens. Users (e.g., developers) who need to process large sets of data need to find out strategies for splitting these large sets of data into chunks, processing the chunks, and merging the results together to generate the final output.

Various embodiments described herein provide a chunking mechanism that dynamically splits large data sets into chunks (also referred to as data chunks). Such data chunks can be processed individually by the large language models. Outputs of the models can be error-corrected, aggregated, and converted into data objects in a desired (e.g., user-defined) object-oriented programming language format for downstream processing. Such a solution allows users to automatically tune the chunk size, so that the user only needs to write the functions for processing the chunk using large language models and updating the internal state before processing the next chunk. This solution requires a user to provide a collection of data units (e.g., paragraphs of a document or a set of documents) and exhaustively search for a set of subsequent data units that most closely meet the token budget of a large language model. User only needs to pass the collection into a function provided by the software library, and write a normal "for" loop over the chunk iterator described herein, returned by the function.

An internal state can refer to a summary of the currently processed amount of data in the format of a desired output. For example, if the desired output is the collection of names mentioned in a document, the internal state can include the collection of names in all documents processed so far.

An iterator (also referred to as data chunk iterator or chunk iterator) can refer to an object that provides a method "next (iterator)," which returns the next element of a collection or indicates an error if a collection is exhausted. It is implemented or can be implemented in all object-oriented programming languages.

Chunk, or data chunk, can refer to a subset of data units that a large language model processes in a single iteration.

In various embodiments, the data management system receives input data that includes a collection of data units. A data unit can refer to a single piece of data that large language models can independently process. The data management system determines that the collection of data units corresponds to a number of tokens that exceeds an upper limit of tokens (e.g., token budget) that a large language model can process. Token budget can refer to a number of tokens that a large language model can process in a single API call. A word can be converted into one or more tokens using a tokenizer.

In various embodiments, in response to determining that the collection of data units corresponds to the number of tokens that exceeds the upper limit of tokens, the data management system processes the collection of data units to generate a plurality of outputs. The processing of the collection can include a number of operations, including dynamically calculating a token budget based on an internal state parameter; using a data chunk iterator to identify a data chunk of the collection that satisfies the token budget;

generating a prompt based on the data chunk of the collection and the internal state parameter; using the large language model to generate an output for the plurality of outputs based on the prompt; and updating the internal state parameter based on the output. The data management system aggregates the plurality of outputs into a final result and passes the final result as function output.

In various embodiments, the data management system generates a schema based on the data chunk of the plurality of data chunks. A schema describes the output in an output format expected in a function output.

In various embodiments, certain large language models support a special mode (e.g., Function Call Mode) of operation where their reply is explicitly constrained to be a data object (e.g., JSON object) conforming to the user-defined schema. Upon determining that the large language model supports the mode of operation that generates one or more data objects of a specific type that conforms to the schema, the data management system generates a prompt without including the schema. The schema is passed as a separate argument (also referred to as a parameter) of the function described herein. If the data management system determines that the large language model does not support such a mode of operation, the data management system generates a prompt to include the schema.

In various embodiments, the data management system receives a request to execute a function that processes the collection of data units to generate a plurality of outputs. In response to receiving the request, the data management system executes the function based on a function definition. The data management system generates a function output by converting the final result into a programming data object in an output format described by a schema. The function output includes one or more programming data objects in the requested machine-readable formats.

In various embodiments, token budget includes a number of tokens that a large language model can process in a single Application Programming Interface (API) call to the large language model. An internal state describes a summary of currently processed data chunks in a predetermined output format. A data chunk iterator can be a programming object that provides a function configured to return a next data unit of the collection or indicate an error if the collection is exhausted. A data unit from the collection of the data units includes a piece of data that is independently processable by the large language model. A data chunk includes a subset of the collection of data units. The subset of the collection includes one of a portion of a single data unit or a portion of one or more data units.

As used herein, a machine learning model can comprise any predictive model (e.g., large language models) that is generated based on training data. Once generated and trained, a machine learning model can receive one or more inputs, extract one or more features, and generate an output for the inputs based on the model's training. A large language model can be a computerized language model that is embodied by an artificial neural network. A large language model (also referred to as LLM or a large language artificial intelligence model) can be trained based on a large amount of text in the form of tokens. Tokens can be basic units of text or code for a large language model to process.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a block diagram showing an example data system 100 that includes a data management system (hereafter, the data management system 122, or system 122), according to various embodiments of the present disclosure. By including the data management system 122, the data system 100 can facilitate the integration of machine learning models into software systems using a software library. As shown, the data system 100 includes one or more client devices 102, a server system 108, and a network 106 (e.g., including Internet, wide-area-network (WAN), local-area-network (LAN), wireless network, etc.) that communicatively couples them together. Each client device 102 can host a number of applications, including a client software application 104. The client software application 104 can communicate data with the server system 108 via a network 106. Accordingly, the client software application 104 can communicate and exchange data with the server system 108 via network 106.

The server system 108 provides server-side functionality via the network 106 to the client software application 104. While certain functions of the data system 100 are described herein as being performed by the data management system 122 on the server system 108. The data management system 122 includes a software library 124 described herein. The software library provides users with one or more functions that handle interactions with machine learning models described herein. It will be appreciated that the data management system 122 may include many systems and/or components that are not shown in FIG. 1.

It will be appreciated that the location of certain functionality within the server system 108 is a design choice. For example, it may be technically preferable to initially deploy certain technology and functionality within the server system 108, but to later migrate this technology and functionality to the client software application 104.

The server system 108 supports various services and operations that are provided to the client software application 104 by the data management system 122. Such operations include transmitting data from the data management system 122 to the client software application 104, receiving data from the client software application 104 to the system 122, and the system 122 processing data generated by the client software application 104. Data exchanges within the data system 100 may be invoked and controlled through operations of software component environments available via one or more endpoints, or functions available via one or more user interfaces of the client software application 104, which may include web-based user interfaces provided by the server system 108 for presentation at the client device 102.

With respect to the server system 108, each of an Application Program Interface (API) server 110 and a web server 112 is coupled to an application server 116, which hosts the data management system 122. The application server 116 is communicatively coupled to a database server 118, which facilitates access to a database 120 that stores data associated with the application server 116, including data that may be generated or used by the data management system 122.

The API server 110 receives and transmits data (e.g., API calls, commands, requests, responses, and authentication data) between the client device 102 and the application server 116. Specifically, the API server 110 provides a set of interfaces (e.g., routines and protocols) that can be called or queried by the client software application 104 in order to invoke the functionality of the application server 116. The API server 110 exposes various functions supported by the application server 116 including, without limitation: user registration; login functionality; data object operations (e.g., generating, storing, retrieving, encrypting, decrypting, transferring, access rights, licensing, etc.); and user communications.

Through one or more web-based interfaces (e.g., web-based user interfaces), the web server 112 can support various functionality of the data management system 122 of the application server 116.

The application server 116 hosts a number of applications and subsystems, including the data management system 122, which supports various functions and services with respect to various embodiments described herein. The application server 116 is communicatively coupled to a database server 118, which facilitates access to database(s) 120 that stores data associated with the data management system 122.

Figure 2:
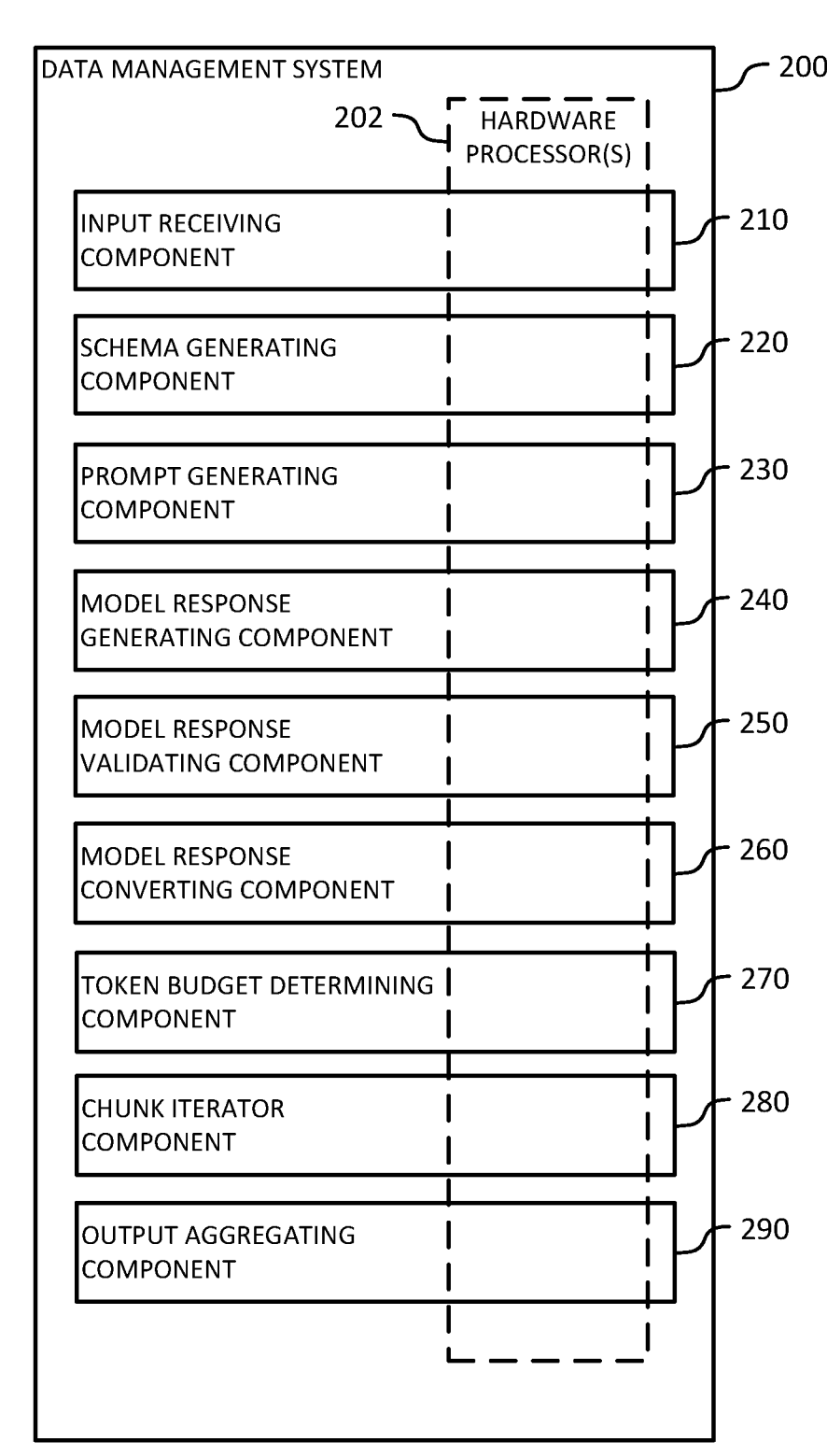
FIG. 2 is a block diagram illustrating an example data management system that facilitates the integration of machine learning models into software systems using a software library, according to various embodiments of the present disclosure.

FIG. 2 is a block diagram illustrating an example data management system 200 that facilitates the integration of machine learning models into software systems using a software library, according to various embodiments of the present disclosure. For some embodiments, the data management system 200 represents an example of the data management system 122 described with respect to FIG. 1. As shown, the data management system 200 comprises an input receiving component 210, a schema generating component 220, a prompt generating component 230, a model response generating component 240, a model response validating component 250, a model response converting component 260, a token budget determining component 270, a chunk iterator component 280, and an output aggregating component 290. According to various embodiments, one or more of the input receiving component 210, the schema generating component 220, the prompt generating component 230, the model response generating component 240, the model response validating component 250, the model response converting component 260, the token budget determining component 270, the chunk iterator component 280, and the output aggregating component 290 are implemented by one or more hardware processors 202. Data generated by one or more of the input receiving component 210, the schema generating component 220, the prompt generating component 230, the model response generating component 240, the model response validating component 250, the model response converting component 260, the token budget determining component 270, the chunk iterator component 280, and the output aggregating component 290 can be stored in a database (not shown) of the data management system 200.

The input receiving component 210 is configured to receive input data that comprises a function definition. The input data can include inputs of a function associated with the function definition and data input (e.g., arguments) of the function. The input data can further include a collection of data units described herein.

The schema generating component 220 is configured to generate one or more schemas that describe output data in an output format expected in the function output.

The prompt generating component 230 is configured to generate prompts that includes the input data. Depending on whether a large language model supports a mode of operation that allows the generation of data objects of a specific type that conforms to a schema, the schema may or may not be included in a prompt.

The model response generating component 240 is configured to use one or more machine learning models (e.g., large language models) to generate model responses in requested machine-readable formats.

The model response validating component 250 is configured to use a data object parsing tool (e.g., JSON parser) to parse the model responses and validate the parsed model responses based on the output schema to ensure the model responses conform to the schema.

The model response converting component 260 is configured to convert the model responses into one or more programming data objects (e.g., JSON objects, Python objects) and provide the requesting user with the one or more programming data objects as function outputs.

The token budget determining component 270 is configured to determine that a collection of data units corresponds to a number of tokens that exceeds an upper limit of tokens (e.g., token budget) that a large language model can process. The token budget determining component 270 is further configured to dynamically calculate a token budget based on an internal state (also referred to as an internal state parameter) described herein.

The chunk iterator component 280 is configured to use a data chunk iterator to identify a data chunk of the collection that satisfies the token budget. A data chunk iterator can refer to an object that provides a method "next (iterator)," which returns the next element of a collection or indicates an error if a collection is exhausted.

The output aggregating component 290 is configured to aggregate a plurality of outputs, generated based on a plurality of data chunks, into a final result and provide a requesting user with the final result as a function output.

Figure 3:
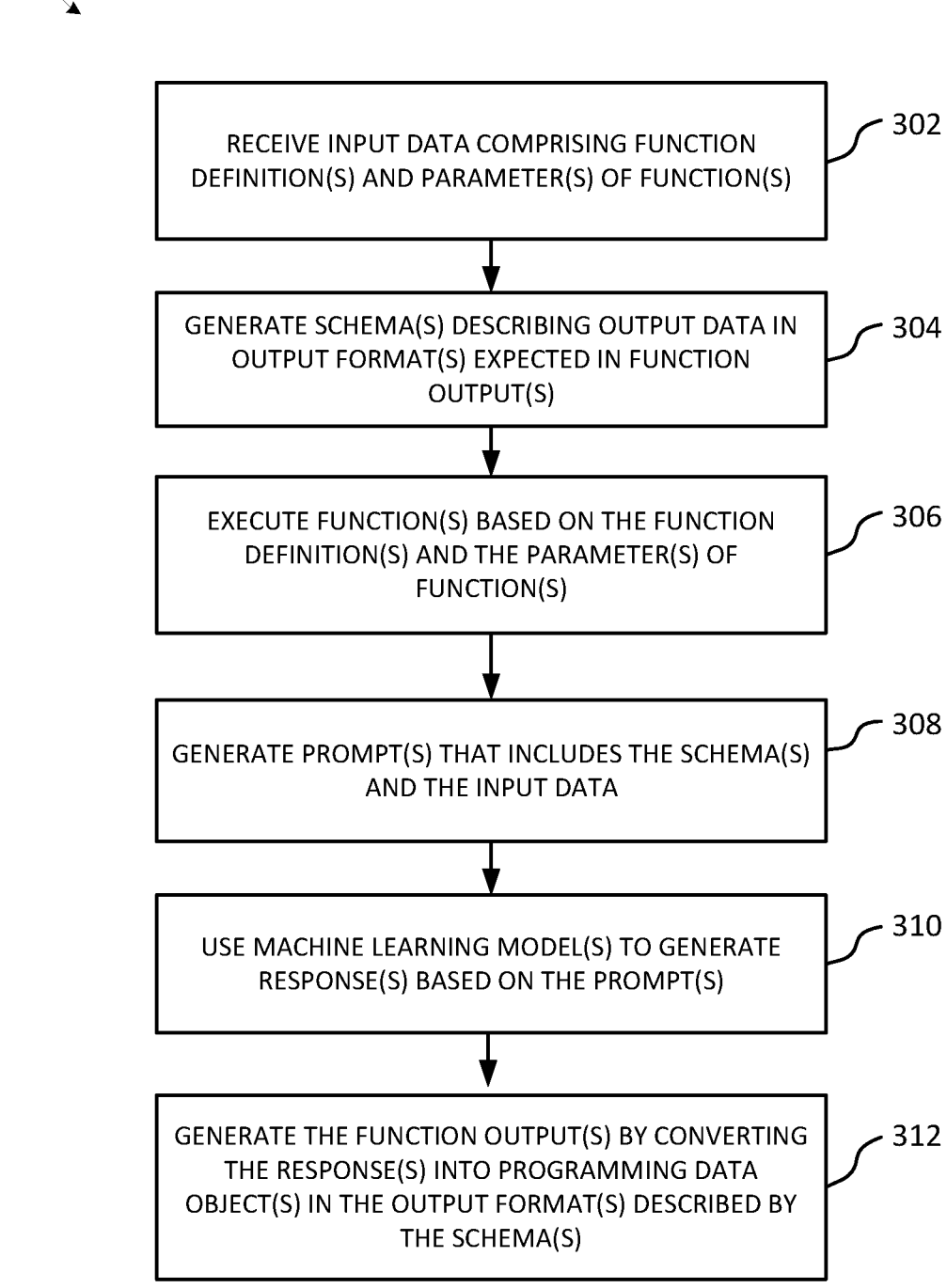
FIG. 3 is a flowchart illustrating an example method for facilitating the integration of machine learning models into software systems using a software library, according to various embodiments of the present disclosure.

FIG. 3 is a flowchart illustrating an example method 300 for facilitating the integration of machine learning models into software systems using a software library, according to various embodiments of the present disclosure. It will be understood that example methods described herein may be performed by a machine in accordance with some embodiments. For example, method 300 can be performed by the data management system 122 described with respect to FIG. 1, the data management system 200 described with respect to FIG. 2, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of method 300 may be represented by executable instructions that, when executed by a processor of a computing device, cause the computing device to perform method 300. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

At operation 302, a processor receives input data that comprises a function definition and parameters (e.g., arguments) of a function. The input data can further include parameters (e.g., arguments) of a function. Arguments can be passed as input for the function provided by the data management system described herein.

At operation 304, a processor generates one or more schemas that describe output data in an output format expected in the function output. An output format can correspond to a format structure for how attribute values associated with the plurality of attributes are presented in the function output.

At operation 306, a processor executes the function based on the input data. The execution of the function handles interactions with machine learning models, such as large language models. Such interactions can include a number of operations, including but not limited to operations 308, 310, and 312.

At operation 308, a processor generates a prompt that includes one or more schemas and the input data. A prompt prefix can refer to a piece of text with one or more instructions that guide the large language models to generate responses in a desired data format. A prompt can include one or more prompt prefixes, one or more instruction templates, one or more function parameters, and one or more schemas (e.g., output type schemas).

At operation 310, a processor uses one or more machine learning models (e.g., large language models) to generate one or more responses based on the prompt. In various embodiments, if a large language model supports a special mode of operation (e.g., Function Call Mode), the processor adds (or appends) the output type schema to a list of function call schemas in the large language model API. Under this approach, the prompt does not include the output type schema. In contrast, if the large language model does not support the special mode of operation, the prompt is generated to include the output type schema and the processor uses the large language model to generate responses based on the prompt.

At operation 312, a processor generates function outputs by converting the model responses into one or more programming data objects in the output format described by the schema. The function output includes one or more programming data objects (e.g., JSON objects, Python objects) generated based on the model responses. The data management system returns the function output in response to receiving instructions (e.g., input data) from a user.

Though not illustrated, method 300 can include an operation where a graphical user interface can be displayed (or caused to be displayed) by the hardware processor. For instance, the operation can cause a client device (e.g., the client device 102 communicatively coupled to the data management system 122) to display the graphical user interface. This operation for displaying the graphical user interface can be separate from operations 302 through 312 or, alternatively, form part of one or more of operations 302 through 312.

FIG. 4 is a flowchart illustrating an example method 400 for facilitating the integration of machine learning models into software systems using a software library, according to various embodiments of the present disclosure. It will be understood that example methods described herein may be performed by a machine in accordance with some embodiments. For example, method 400 can be performed by the data management system 122 described with respect to FIG. 1, the data management system 200 described with respect to FIG. 2, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of method 400 may be represented by executable instructions that, when executed by a processor of a computing device, cause the computing device to perform method 400. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

At operation 402, the processor uses a data object parsing tool (e.g., JSON parser) to parse the model responses. Data object parsing can refer to a process of converting a data object in text format to a programming data object that can be used in a software program.

At operation 404, the processor validates the parsed model responses based on the schema to ensure the parsed responses conform to the schema.

At operation 406, In response to determining that the parsed response is successfully validated, the processor converts the model responses into one or more programming data objects (e.g., JSON objects, Python objects) and provides the requesting user with the one or more programming data objects as function outputs.

Though not illustrated, method 400 can include an operation where a graphical user interface can be displayed (or caused to be displayed) by the hardware processor. For instance, the operation can cause a client device (e.g., the client device 102 communicatively coupled to the data management system 122) to display the graphical user interface. This operation for displaying the graphical user interface can be separate from operations 402 through 406 or, alternatively, form part of one or more of operations 402 through 406.

FIG. 5 is a flowchart illustrating an example method 500 for facilitating the integration of machine learning models into software systems using a software library, according to various embodiments of the present disclosure. It will be understood that example methods described herein may be performed by a machine in accordance with some embodiments. For example, method 500 can be performed by the data management system 122 described with respect to FIG. 1, the data management system 200 described with respect to FIG. 2, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of method 500 may be represented by executable instructions that, when executed by a processor of a computing device, cause the computing device to perform method 500. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

At operation 502, the processor determines if an error occurred during at least one of the operations, including the operation (e.g., operation 402) of parsing the response; the operation (e.g., operation 404) of validating the parsed response, and the operation of generating the one or more programming data objects in the requested machine-readable format. The generation of the one or more programming data objects in the requested machine-readable format can include the operation (e.g., operation 406) of converting the model responses into the one or more programming data objects based on an output type schema.

At operation 504, once an error is detected, the processor generates a further prompt (e.g., the second prompt) based on a text description of the error and the model response that includes the error.

At operation 506, the processor uses a machine learning model (e.g., large language model) to generate a further model response (e.g., second response) in the output format (e.g., requested machine-readable format) based on the further prompt.

In various embodiments, if the output type schema is not included in the further prompt because the large language model supports the special mode of operation described herein, the processor uses the large language model to generate the further model response based on the further prompt and the output type schema which is passed as a separate argument of a function described herein.

Though not illustrated, method 500 can include an operation where a graphical user interface can be displayed (or caused to be displayed) by the hardware processor. For instance, the operation can cause a client device (e.g., the client device 102 communicatively coupled to the data management system 122) to display the graphical user interface. This operation for displaying the graphical user interface can be separate from operations 502 through 506 or, alternatively, form part of one or more of operations 502 through 506.

Figure 6:
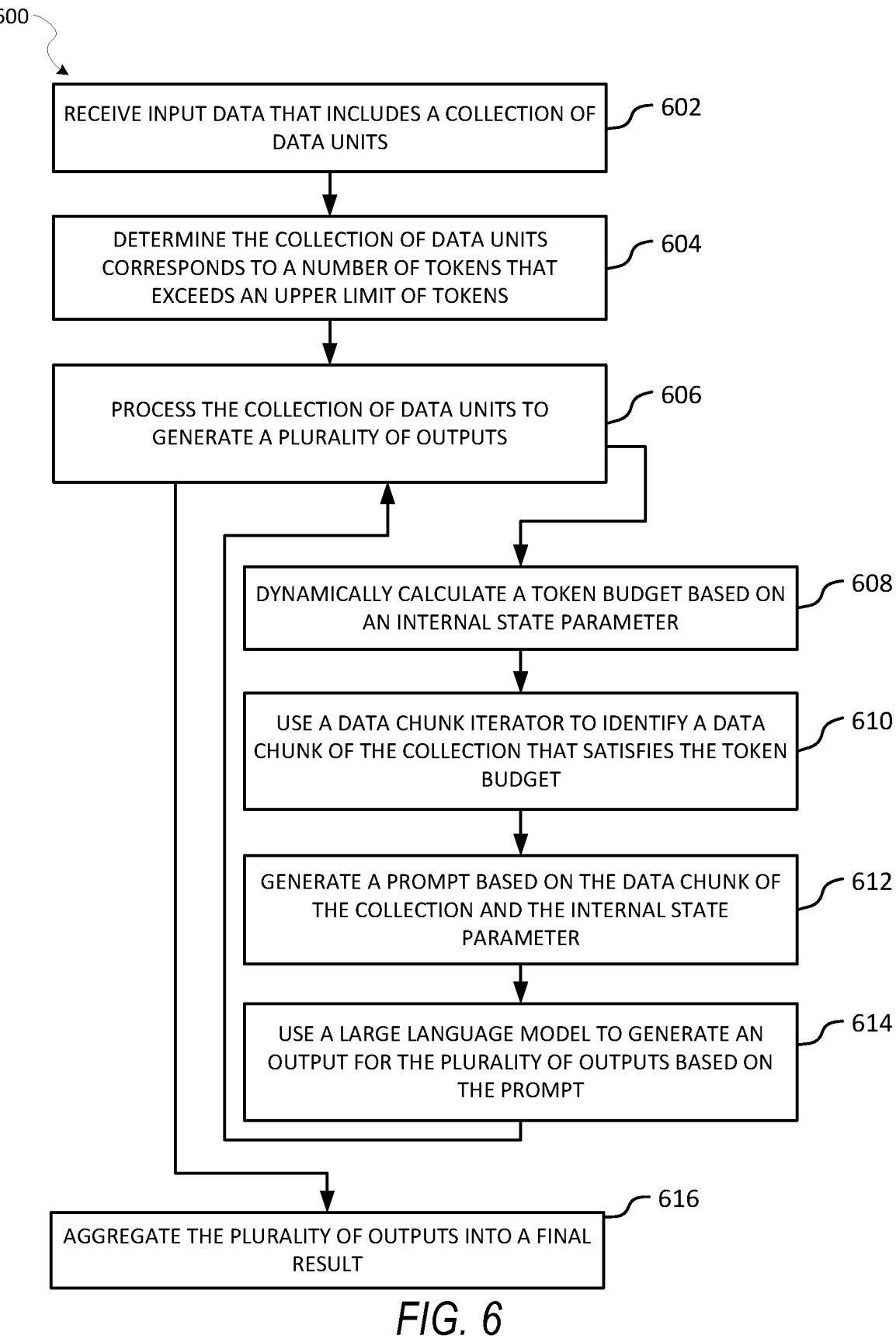
FIG. 6 is a flowchart illustrating an example method for facilitating the integration of machine learning models into software systems using a software library, according to various embodiments of the present disclosure.

FIG. 6 is a flowchart illustrating an example method 500 for facilitating the integration of machine learning models into software systems using a software library, according to various embodiments of the present disclosure. It will be understood that example methods described herein may be performed by a machine in accordance with some embodiments. For example, method 600 can be performed by the data management system 122 described with respect to FIG. 1, the data management system 200 described with respect to FIG. 2, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of method 600 may be represented by executable instructions that, when executed by a processor of a computing device, cause the computing device to perform method 600. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

At operation 602, the processor receives input data that includes a collection of data units. A data unit can refer to a single piece of data that large language models can independently process.

At operation 604, the processor determines that the collection of data units corresponds to a number of tokens that exceeds an upper limit of tokens (e.g., token budget) that a large language model can process. Token budget can refer to a number of tokens that a large language model can process in a single API call.

At operation 606, the processor processes the collection of data units to generate a plurality of outputs. The processing of the collection can include a number of operations, such as operations 608 through 614. In various embodiments, data management system can provide one or more functions that can be called to handles the processing of the collection of data units. For example, inputs to a function that is provided to processing of the collection of data units can include instruction prompt template, zero or more arguments (also referred to as function parameters, or parameters) passed as symbolic chunk iterators, and zero or more arguments representing internal state parameter. Example outputs of such a function can include a final results that includes aggregated (or merged) outputs resulting from the processing of the collection.

At operation 608, the processor dynamically calculates a token budget based on an internal state parameter. The internal state parameter is updated before the processor identifies and process a next data chunk. As more data chunks are identified and processed, the size of the internal state parameter continues to grow. Given that the total length of model input and output is limited, the token budget of each data chunk is dynamically calculated based on the current size of the internal state parameter, so that the number of tokens in the resulting prompt is not larger than the maximum number of tokens supported by the large language model.

At operation 610, the processor uses a data chunk iterator to identify a data chunk of the collection that satisfies the token budget. When identifying a data chunk from the collection, the subsequent (unconsumed or unprocessed) data units are exhaustively searched so that the data chunk includes data units that closely meet the token budget. Under this approach, the user only needs to pass the collection into a function provided by the library and write a normal "for" loop over the iterator, returned by that function.

At operation 612, the processor generates a prompt based on the data chunk of the collection and the internal state parameter. In various embodiments, the prompt includes the data chunk and the internal state parameter.

At operation 614, the processor uses a large language model to generate an output for the plurality of outputs based on the prompt.

At operation 616, the processor updates the internal state parameter based on the output.

At operation 618, the processor aggregates the plurality of outputs into a final result and passes the final result as function output.

In various embodiments, a data chunk can include a subset of the collection of data units. A subset of the collection of data units can include one of a portion of a single data unit or a portion of one or more data units.

In various embodiments, a data chunk iterator includes a pointer to the collection of data units and a pointer to an unconsumed data unit of the collection of data units.

Though not illustrated, method 600 can include an operation where a graphical user interface can be displayed (or caused to be displayed) by the hardware processor. For instance, the operation can cause a client device (e.g., the client device 102 communicatively coupled to the data management system 122) to display the graphical user interface. This operation for displaying the graphical user interface can be separate from operations 602 through 616 or, alternatively, form part of one or more of operations 602 through 616.

In various embodiments, the data management system can provide a function (e.g., ProcessLongText) that can be called to process a collection of data units. Inputs of such a function can include instruction prompt template, zero or more arguments passed as symbolic chunk iterators, and zero or more arguments representing internal state parameter. An example algorithm associated with the function (e.g., ProcessLongText) can be illustrated below:

In various embodiments, for chunk_size in [1 . . . maximum size of collection passed through symbolic chunk]:

1. Replacing all arguments of type "Symbolic Chunk Iterator" with slices of corresponding collections of size chunk_size.
2. Using instruction template to generate a prompt with the corresponding arguments via a function (e.g., BuildPrompt).
3. If the number of tokens in the resulting prompt is larger than the maximum number of tokens supported by the large language model, returning to the previous prompt and exit the loop.

In various embodiments, a processor runs a large language model to generate model responses based on the prompt via a function (e.g., CallFunction)

In various embodiments, for every symbolic chunk in input arguments, a processor advances the pointer to the first element by the chunk_size.

In various embodiments, a processor returns the model response.

Figure 7:
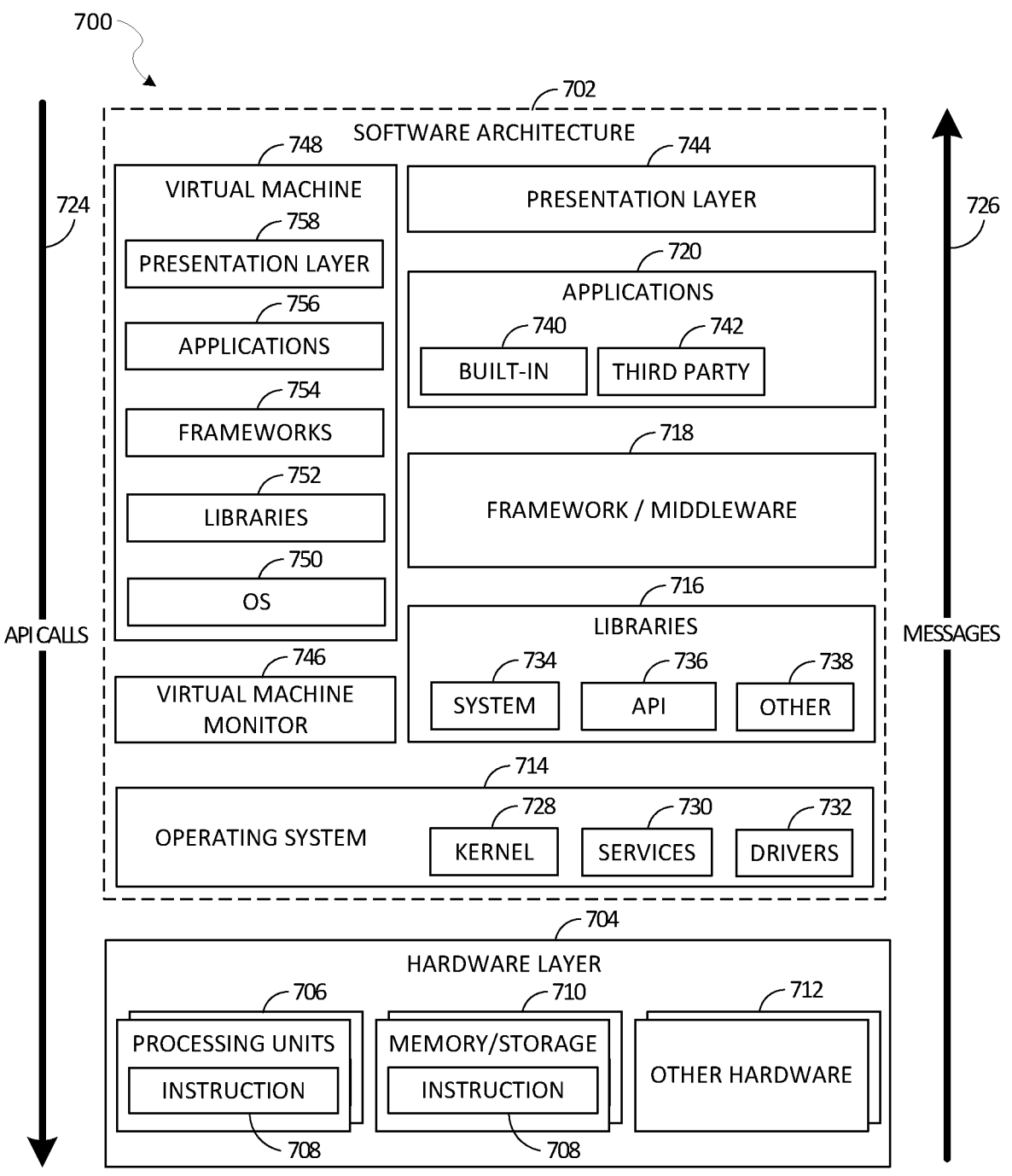
FIG. 7 is a block diagram illustrating a representative software architecture, which may be used in conjunction with various hardware architectures herein described, according to various embodiments of the present disclosure.

FIG. 7 is a block diagram 700 illustrating an example of a software architecture 702 that may be installed on a machine, according to some example embodiments. FIG. 7 is merely a non-limiting example of a software architecture, and it will be appreciated that many other architectures may be implemented to facilitate the functionality described herein. The software architecture 702 may be executing on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 comprises one or more processing units 706 having associated executable instructions 708. The executable instructions 708 represent the executable instructions of the software architecture 702. The hardware layer 704 also includes memory or storage modules 710, which also have the executable instructions 708. The hardware layer 704 may also comprise other hardware 712, which represents any other hardware of the hardware layer 704, such as the other hardware illustrated as part of the machine 800.

In the example architecture of FIG. 7, the software architecture 702 may be conceptualized as a stack of layers, where each layer provides particular functionality. For example, the software architecture 702 may include layers such as an operating system 714, libraries 716, frameworks/middleware 718, applications 720, and a presentation layer 744. Operationally, the applications 720 or other components within the layers may invoke API calls 724 through the software stack and receive a response, returned values, and so forth (illustrated as messages 726) in response to the API calls 724. The layers illustrated are representative in nature, and not all software architectures have all layers. For example, some mobile or special-purpose operating systems may not provide a frameworks/middleware 718 layer, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 716 may provide a common infrastructure that may be utilized by the applications 720 and/or other components and/or layers. The libraries 716 typically provide functionality that allows other software modules to perform tasks in an easier fashion than by interfacing directly with the underlying operating system 714 functionality (e.g., kernel 728, services 730, or drivers 732). The libraries 716 may include system libraries 734 (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The frameworks 718 (also sometimes referred to as middleware) may provide a higher-level common infrastructure that may be utilized by the applications 720 or other software components/modules. For example, the frameworks 718 may provide various graphical user interface functions, high-level resource management, high-level location services, and so forth. The frameworks 718 may provide a broad spectrum of other APIs that may be utilized by the applications 720 and/or other software components/modules, some of which may be specific to a particular operating system or platform.

The applications 720 include built-in applications 740 and/or third-party applications 742. Examples of representative built-in applications 740 may include, but are not limited to, a home application, a contacts application, a browser application, a book reader application, a location application, a media application, a messaging application, or a game application.

The third-party applications 742 may include any of the built-in applications 740, as well as a broad assortment of other applications. In a specific example, the third-party applications 742 (e.g., an application developed using the Android™ or iOS™ software development kit (SDK) by an entity other than the vendor of the particular platform) may be mobile software running on a mobile operating system such as iOS™, Android™, or other mobile operating systems. In this example, the third-party applications 742 may invoke the API calls 724 provided by the mobile operating system such as the operating system 714 to facilitate functionality described herein.

The applications 720 may utilize built-in operating system functions (e.g., kernel 728, services 730, or drivers 732), libraries (e.g., system libraries 734, API libraries 736, and other libraries 738), or frameworks/middleware 718 to create user interfaces to interact with users of the system. Alternatively, or additionally, in some systems, interactions with a user may occur through a presentation layer, such as the presentation layer 744. In these systems, the application/module "logic" can be separated from the aspects of the application/module that interact with the user.

Some software architectures utilize virtual machines. In the example of FIG. 7, this is illustrated by a virtual machine 748. The virtual machine 748 creates a software environment where applications/modules can execute as if they were executing on a hardware machine (e.g., the machine 800 of FIG. 8). The virtual machine 748 is hosted by a host operating system (e.g., the operating system 714) and typically, although not always, has a virtual machine monitor 746, which manages the operation of the virtual machine 748 as well as the interface with the host operating system (e.g., the operating system 714). A software architecture executes within the virtual machine 748, such as an operating system 750, libraries 752, frameworks/middleware 754, applications 756, or a presentation layer 758. These layers of software architecture executing within the virtual machine 748 can be the same as corresponding layers previously described or may be different.

Figure 8:
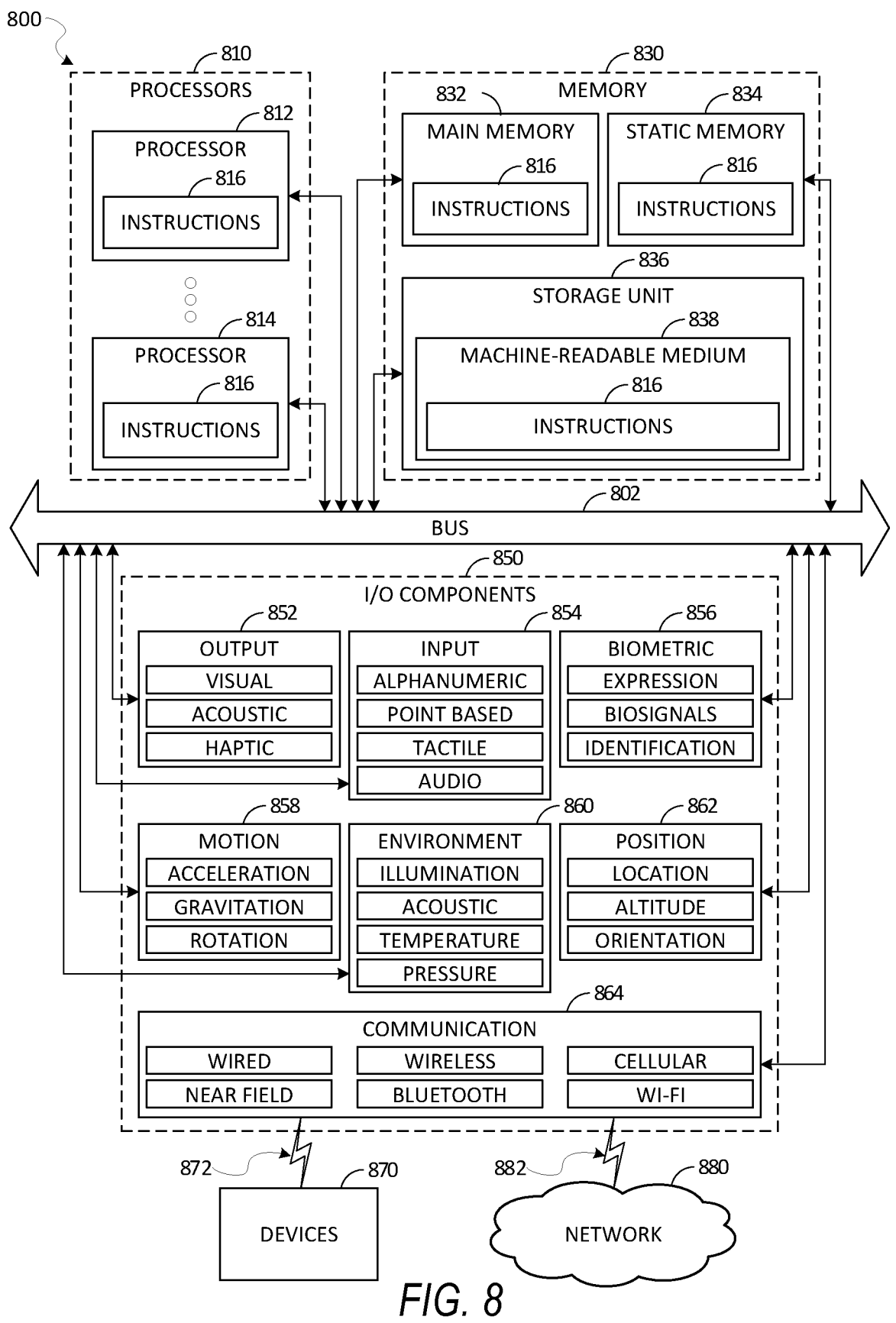
FIG. 8 is a block diagram illustrating components of a machine able to read instructions from a machine storage medium and perform any one or more of the methodologies discussed herein according to various embodiments of the present disclosure.

FIG. 8 illustrates a diagrammatic representation of a machine 800 in the form of a computer system within which a set of instructions may be executed for causing the machine 800 to perform any one or more of the methodologies discussed herein, according to an embodiment. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute the method 300 described above with respect to FIG. 3, the method 400 described above with respect to FIG. 4, the method 500 described above with respect to FIG. 5, the method 600 described above with respect to FIG. 6. The instructions 816 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory 830, and I/O components 850, which may be configured to communicate with each other such as via a bus 802. In an embodiment, the processors 810 (e.g., a hardware processor, such as a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors that may comprise two or more independent processors (sometimes referred to as "cores") that may execute instructions contemporaneously. Although FIG. 8 shows multiple processors 810, the machine 800 may include a single processor with a single core, a single processor with multiple cores (e.g., a multi-core processor), multiple processors with a single core, multiple processors with multiples cores, or any combination thereof.

The memory 830 may include a main memory 832, a static memory 834, and a storage unit 836 including machine-readable medium 838, each accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 may include a wide variety of components to receive input, provide output, produce output, transmit information, exchange information, capture measurements, and so on. The specific I/O components 850 that are included in a particular machine will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion, and the grouping is in no way limiting. In various embodiments, the I/O components 850 may include output components 852 and input components 854. The output components 852 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further embodiments, the I/O components 850 may include biometric components 856, motion components 858, environmental components 860, or position components 862, among a wide array of other components. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 862 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, near field communication (NFC) components, Bluetooth® components (e.g., Bluetooth® Low Energy), Wi-FiR components, and other communication components to provide communication via other modalities. The devices 870 may be another machine or any of a wide variety of peripheral devices (e.g., a peripheral device coupled via a USB).

Moreover, the communication components 864 may detect identifiers or include components operable to detect identifiers. For example, the communication components 864 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 864, such as location via Internet Protocol (IP) geolocation, location via Wi-Fi® signal triangulation, location via detecting an NFC beacon signal that may indicate a particular location, and so forth.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In various embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an ASIC. A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 800 including processors 810), with these operations being accessible via a network (e.g., the Internet) and via one or more appropriate interfaces (e.g., an API). In certain embodiments, for example, a client device may relay or operate in communication with cloud computing systems, and may access circuit design information in a cloud environment.

The performance of certain of the operations may be distributed among the processors, not only residing within a single machine 800, but deployed across a number of machines 800. In some example embodiments, the processors 810 or processor-implemented modules are located in a single geographic location (e.g., within a home environment, an office environment, or a server farm). In other example embodiments, the processors or processor-implemented modules are distributed across a number of geographic locations.

Executable Instructions and Machine Storage Medium

The various memories (i.e., 830, 832, 834, and/or the memory of the processor(s) 810) and/or the storage unit 836 may store one or more sets of instructions 816 and data structures (e.g., software) embodying or utilized by any one or more of the methodologies or functions described herein. These instructions (e.g., the instructions 816), when executed by the processor(s) 810, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 816 and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various embodiments, one or more portions of the network 880 may be an ad hoc network, an intranet, an extranet, a virtual private network (VPN), a LAN, a wireless LAN (WLAN), a WAN, a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), World-wide Interoperability for Microwave Access (WiMAX), Long-Term Evolution (LTE) standard, others defined by various standard-setting organizations, other long-range protocols, or other data transfer technology.

The instructions may be transmitted or received over the network using a transmission medium via a network interface device (e.g., a network interface component included in the communication components) and utilizing any one of a number of well-known transfer protocols (e.g., hypertext transfer protocol (HTTP)). Similarly, the instructions may be transmitted or received using a transmission medium via the coupling (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions for execution by the machine, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals. For instance, an embodiment described herein can be implemented using a non-transitory medium (e.g., a non-transitory computer-readable medium).

Throughout this specification, plural instances may implement resources, components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components.

As used herein, the term "or" may be construed in either an inclusive or exclusive sense. The terms "a" or "an" should be read as meaning "at least one," "one or more," or the like. The presence of broadening words and phrases such as "one or more," "at least," "but not limited to," or other like phrases in some instances shall not be read to mean that the narrower case is intended or required in instances where such broadening phrases may be absent. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. The specification and drawings are, accordingly, to be regarded in an illustrative rather than a restrictive sense.

It will be understood that changes and modifications may be made to the disclosed embodiments without departing from the scope of the present disclosure. These and other changes or modifications are intended to be included within the scope of the present disclosure.

What is claimed is:

1. A method comprising:

receiving, by at least one processor, a request to execute a function that processes a collection of data units to generate a plurality of outputs, the request comprising input data that comprises the collection of data units; and in response to receiving the request, executing the function based on a function definition, the executing of the function comprising:

determining that the collection of data units corresponds to a number of tokens that exceeds an upper limit of tokens that can be processed by a large language model; and in response to determining that the collection of data units corresponds to the number of tokens that exceeds the upper limit of tokens:

processing the collection of data units to generate the plurality of outputs, the processing of the collection of data units comprising:

dynamically calculating a token budget based on an internal state parameter;

using a data chunk iterator to identify a data chunk of the collection of data units that satisfies the token budget, the data chunk iterator comprising a first pointer to the collection of data units and a second pointer to a next unconsumed data unit of the collection of data units, the second pointer advancing to a subsequent unconsumed data unit by a chunk size to be processed after the next unconsumed data unit is processed;

generating a prompt based on the data chunk of the collection of data units and the internal state parameter, wherein the prompt being an input to the large language model;

generating a schema based on the data chunk, the schema describing an output format expected for output data, and the schema comprising an object class structure definition that comprises a plurality of attributes and a natural language description for each attribute from the plurality of attributes;

using the large language model to generate an output for the plurality of outputs based on the prompt and the schema; and updating the internal state parameter based on the output; aggregating the plurality of outputs into a final result; and generating a function output by converting the final result into a programming data object in the output format described by the schema.

2. The method of claim 1, comprising:

determining that the large language model supports a mode of operation that generates one or more data objects of a specific type that conforms to the schema; and in response to determining that the large language model supports the mode of operation, generating the prompt without including the schema.

3. The method of claim 1, comprising:

determining that the large language model does not support a mode of operation that generates one or more data objects of a specific type that conforms to the schema; and in response to determining that the large language model does not support the mode of operation, generating the prompt that includes the schema.

4. The method of claim 1, comprising:

using a data object parsing tool to parse the output; and validating the parsed output based on the schema.

5. The method of claim 1, wherein the token budget comprises the number of tokens that the large language model is capable of processing in a single Application Programming Interface (API) call to the large language model.

6. The method of claim 1, wherein the internal state parameter describes a summary of currently processed data chunks in a predetermined output format expected for the output data.

7. The method of claim 1, wherein the function is a first function, and wherein the data chunk iterator is a programming object that provides a second function configured to return the next unconsumed data unit of the collection of data units or indicate an error if the collection of data units is exhausted.

8. The method of claim 1, wherein a data unit from the collection of the data units comprises a piece of data that is independently processable by the large language model.

9. The method of claim 1, wherein the data chunk comprises a subset of the collection of data units, the subset of the collection of data units comprising one of a portion of a single data unit or a portion of one or more data units.

10. A system comprising:

one or more hardware processors, and a non-transitory machine-readable medium for storing instructions that, when executed by the one or more hardware processors, cause the one or more hardware processors to perform the operations comprising:

receiving a request to execute a function that processes a collection of data units to generate a plurality of outputs, the request comprising input data that comprises the collection of data units determining that the collection of data units corresponds to a number of tokens that exceeds an upper limit of tokens that can be processed by a large language model; and in response to determining that the collection of data units corresponds to the number of tokens that exceeds the upper limit of tokens:

processing the collection of data units to generate the plurality of outputs, the processing of the collection of data units comprising:

dynamically calculating a token budget based on an internal state parameter;

using a data chunk iterator to identify a data chunk of the collection of data units that satisfies the token budget, the data chunk iterator comprising a first pointer to the collection of data units and a second pointer to a next unconsumed data unit of the collection of data units, the second pointer advancing to a subsequent unconsumed data unit by a chunk size to be processed after the next unconsumed data unit is processed;

generating a prompt based on the data chunk of the collection of data units and the internal state parameter, wherein the prompt being an input to the large language model;

generating a schema based on the data chunk, the schema describing an output format expected for output data, and the schema comprising an object class structure definition that comprises a plurality of attributes and a natural language description for each attribute from the plurality of attributes;

using the large language model to generate an output for the plurality of outputs based on the prompt and the schema; and updating the internal state parameter based on the output; aggregating the plurality of outputs into a final result; and generating a function output by converting the final result into a programming data object in the output format described by the schema.

11. The system of claim 10, wherein the operations comprise:

determining that the large language model supports a mode of operation that generates one or more data objects of a specific type that conforms to the schema; and in response to determining that the large language model supports the mode of operation, generating the prompt without including the schema.

12. The system of claim 10, wherein the operations comprise:

determining that the large language model does not support a mode of operation that generates one or more data objects of a specific type that conforms to the schema; and in response to determining that the large language model does not support the mode of operation, generating the prompt that includes the schema.

13. The system of claim 10, wherein the internal state parameter describes a summary of currently processed data chunks in a predetermined output format expected for the output data, and wherein the data chunk iterator is a programming object that provides a second function configured to return the next unconsumed data unit of the collection of data units or indicate an error if the collection of data units is exhausted.

14. A non-transitory machine readable medium for storing instructions, that, when executed by one or more hardware processors, cause the one or more hardware processors to perform operations comprising:

receiving a request to execute a function that processes a collection of data units to generate a plurality of outputs, the request comprising input data that comprises the collection of data units and a schema, the schema describing an output format expected for output data, and the schema comprising an object class structure definition that comprises a plurality of attributes and a natural language description for each attribute from the plurality of attributes; and in response to receiving the request, executing the function based on a function definition, the executing of the function comprising:

determining that the collection of data units corresponds to a number of tokens that exceeds an upper limit of tokens that can be processed by a large language model; and in response to determining that the collection of data units corresponds to the number of tokens that exceeds the upper limit of tokens:

processing the collection of data units to generate the plurality of outputs, the processing of the collection of data units comprising:

dynamically calculating a token budget based on an internal state parameter;

using a data chunk iterator to identify a data chunk of the collection of data units that satisfies the token budget, the data chunk iterator comprising a first pointer to the collection of data units and a second pointer to a next unconsumed data unit of the collection of data units, the second pointer advancing to a subsequent unconsumed data unit by a chunk size to be processed after the next unconsumed data unit is processed;

generating a prompt based on the data chunk of the collection of data units and the internal state parameter, wherein the prompt being an input to the large language model;

generating the schema based on the data chunk, the schema describing the output format expected for the output data, and the schema comprising an object class structure definition that comprises the plurality of attributes and the natural language description for each of the attribute from the plurality of attributes;

using the large language model to generate an output for the plurality of outputs based on the prompt and the schema; and updating the internal state parameter based on the output; aggregating the plurality of outputs into a final result; and generating a function output by converting the final result into a programming data object in the output format described by the schema.

15. The non-transitory machine-readable medium of claim 14, wherein the operations comprise:

determining that the large language model supports a mode of operation that generates one or more data objects of a specific type that conforms to the schema; and in response to determining that the large language model supports the mode of operation, generating the prompt without including the schema.

16. The non-transitory machine-readable medium of claim 14, wherein the operations comprise:

determining that the large language model does not support a mode of operation that generates one or more data objects of a specific type that conforms to the schema; and in response to determining that the large language model does not support the mode of operation, generating the prompt that includes the schema.

17. The non-transitory machine-readable medium of claim 14, wherein the internal state parameter describes a summary of currently processed data chunks in a predetermined output format expected for the output data, and wherein the data chunk iterator is a programming object that provides a second function configured to return the next unconsumed data unit of the collection of data units or indicate an error if the collection of data units is exhausted.

18. The non-transitory machine-readable medium of claim 14, wherein the token budget comprises the number of tokens that the large language model is capable of processing in a single Application Programming Interface (API) call to the large language model.

19. The non-transitory machine-readable medium of claim 14, wherein a data unit from the collection of the data units comprises a piece of data that is independently processable by the large language model.

* * * * *